United States Patent [19]

Den Hartog et al.

[11] 4,111,870
[45] Sep. 5, 1978

[54] PRIMER COMPOSITION OF AN ACRYLIC EPOXY ESTER GRAFT COPOLYMER, A HIGH MOLECULAR WEIGHT EPOXY RESIN AND A HEAT REACTIVE CONDENSATE

[75] Inventors: Herman Charles Den Hartog, Pontiac; Aloysius Norbert Walus, Troy, both of Mich.

[73] Assignee: E. I. Du Pont de Nemours and Company, Wilmington, Del.

[21] Appl. No.: 800,066

[22] Filed: May 24, 1977

[51] Int. Cl.$^2$ .......................... C09D 3/52; C09D 3/58
[52] U.S. Cl. ........................................ 260/21; 260/15; 260/17 R; 260/834; 260/837 R; 428/334; 428/339
[58] Field of Search ...................... 260/21, 834, 837 R, 260/15, 17 R; 428/334, 339

[56] References Cited

U.S. PATENT DOCUMENTS

| | | | |
|---|---|---|---|
| 3,272,647 | 9/1966 | Swanson et al. | 260/834 |
| 3,276,905 | 10/1966 | Porter | 260/17 R |
| 3,509,086 | 4/1970 | Rohrbacher | 260/837 R |
| 3,707,516 | 12/1972 | Walus | 260/21 |
| 3,816,557 | 6/1974 | Swanson et al. | 260/837 R |
| 3,819,567 | 6/1974 | Swanson et al. | 260/837 R |
| 3,835,076 | 9/1974 | Jeffery et al. | 260/21 |
| 3,845,002 | 10/1974 | Hiss | 260/837 R |

OTHER PUBLICATIONS

Shell Bulletin, Jun., 1971, pp. 1–4, "Epanol ®" Resins.

*Primary Examiner*—Ronald W. Griffin

[57] ABSTRACT

A coating composition of film-forming constituents in an organic solvent wherein the film-forming constituents are (1) a graft copolymer having a backbone primarily of methyl methacrylate or styrene and side chains of an epoxy ester of an epoxy resin and dimer fatty acids terminated with monocarboxylic acid.

(2) a high molecular weight epoxy hydroxy polyether resin; and (3) a heat reactive condensate such as an alkylated benzoguanamine formaldehyde, an alkylated urea formaldehyde or an alkylate melamine formaldehyde;

the coating composition is a high quality primer for metal substrates and is used in the manufacture of automobile and truck bodies.

15 Claims, No Drawings

PRIMER COMPOSITION OF AN ACRYLIC EPOXY ESTER GRAFT COPOLYMER, A HIGH MOLECULAR WEIGHT EPOXY RESIN AND A HEAT REACTIVE CONDENSATE

BACKGROUND OF THE INVENTION

This invention relates to coating compositions, and in particular, to a high quality primer composition for automobile and truck bodies.

Primer compositions and sealer compositions of epoxy polymers have been used by the automobile and truck manufacturing industry and are shown in Swanson et al. U.S. Pat. No. 3,272,647, issued Sept. 13, 1966 and Rohrbacher U.S. Pat. No. 3,509,086, issued Apr. 28, 1970. Primers of acrylic epoxy ester graft copolymers are shown in Walus U.S. Pat. No. 3,707,516, issued Dec. 26, 1972 and patents to Swanson & Walus U.S. Pat. No. 3,816,557 issued June 11, 1974 and U.S. Pat. No. 3,819,567 issued June 25, 1974. While the aforementioned primer compositions and sealer compositions are excellent for many uses, the automobile and truck manufacturing industry is in need of a primer composition that provides improved appearance to topcoats applied thereto. Also, the primer should have good stability and primer coatings should have good chip and crack resistance, excellent corrosion resistance and excellent adhesion to metal substrates and provide a smooth, even surface to which exterior acrylic polymer coatings will adhere.

SUMMARY OF THE INVENTION

The coating composition of this invention comprises a solution of 5-60% by weight of film-forming constituents in an organic solvent, in which the film-forming constituents consist essentially of (1) 20-85% by weight of an acrylic epoxy ester graft copolymer having a relative viscosity of about 1.040-1.100 measured at 0.5% polymer solids in dichloroethylene solvent at 25° C. and comprising a 10-75% by weight of a polymeric backbone segment and 90-25% by weight of polymeric side chain segments; wherein (a) the polymeric backbone segment of the graft copolymer consists essentially of polymerized monomers selected from the group of methyl methacrylate or styrene or mixtures thereof; about 0.5-5% by weight, based on the weight of the copolymer, of polymerized methacrylic acid or acrylic acid monomers; and about 0.5-10% by weight, based on the weight of the copolymer, of polymerized adhesion promoting acrylic monomers;

(b) the polymeric side chain segments are grafted into the backbone segment and have the following formula which is shown as being grafted into the backbone segment

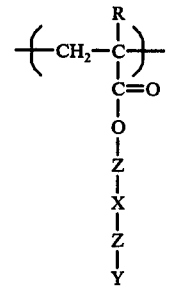

wherein
R is H or CH$_3$;
Z is the residual of an epoxy hydroxy polyether resin that has the following recurring structural unit

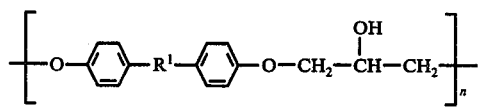

where n is a positive integer sufficiently large to provide a weight average molecular weight of 500-4,000 and R$^1$ is an alkylene group;
X is the residual of a dimer dicarboxylic fatty acid in which the carboxyl groups of the fatty acid are reacted with the terminal epoxy groups of the epoxy hydroxy polyether resin; and
Y is the residual of an aromatic, cycloaliphatic or aliphatic monocarboxylic acid in which the carboxyl group is reacted with a terminal epoxy group of the epoxy hydroxy polyether resin;

(2) 5-70% by weight of a high molecular weight epoxy hydroxy polyether resin of the formula

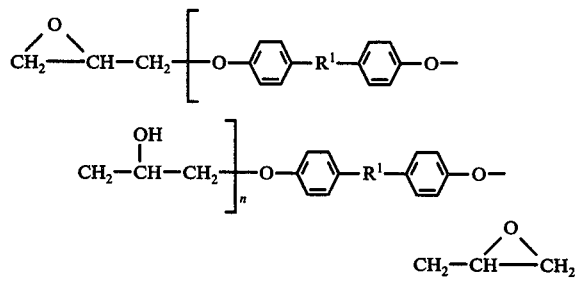

where R$^1$ is an alkylene group and n is an integer sufficiently large to provide a weight average molecular weight of about 30,000-200,000; and (3) 10-35% by weight a heat reactive condensate selected from the group of an alkylated melamine formaldehyde, an alkylated urea formaldehyde, an alkylated benzoguanamine formaldehyde or mixtures thereof wherein the alkyl groups have 1-4 carbon atoms.

DESCRIPTION OF THE INVENTION

The coating composition is a solution that contains about 5-60% by weight of film-forming constituents. Generally, the composition contans about 20-50% by weight of film-forming constiutuents. The film-forming constituents are of about 20–85% by weight of an acrylic epoxy ester graft copolymer, 5–70% by weight of a high molecular weight epoxy hydroxy polyether resin and 10–35% by weight of a heat reactive condensate.

One particularly useful composition contains as the film-forming constituents 55–65% by weight of an acrylic epoxy ester graft copolymer, 15–25% by weight of a high molecular weight hydroxy polyether resin, 5–15% by weight of a butylated benzoguanamine formaldehyde and 5–15% by weight of methylated urea formaldehyde. Another useful composition contains 35–45% by weight of an acrylic epoxy ester graft copolymer, 35–45% by weight of a high molecular weight epoxy hydroxy polyether resin, 5–15% by weight of a butylated benzoguanamine formaldehyde and 5–15% by weight of methylated urea formaldehyde. Still another useful composition contains 55–65%, by weight of an epoxy ester graft copolymer, 10–35% by weight of a high molecular weight epoxy hydroxy polyether resin and 15–25% by weight of a methylated urea formaldehyde.

The molecular weight for any polymers used in this invention is determined by gel permeation chromatography using polymethyl methacrylate as the standard.

The composition has excellent physical properties, such as good adhesion to bare metal substrates, chip resistance, crack and mar resistance and excellent salt corrosion resistance which makes the coating particularly suitable as a primer composition for metals. Acrylic enamel or lacquer topcoats can be applied directly to the composition without sanding or the use of an intermediate sealer coat and the topcoat has excellent adhesion to the composition and has a good appearance.

The coating composition is also useful as a sealer or a primer surfacer. Sealer composition and primer surfacers are applied over a primed surface and provide a finish to which acrylic lacquer or enamel topcoats can be applied. Generally, the sealer composition is non-pigmented or only slightly pigmented and can have a pigment volume concentration as low as about 0.1% while primer surfacers are highly pigmented and have a pigment volume concentration of about 15–60%. These primer surfacers are easily shaped by sanding or buffing. Also, the novel composition of this invention can be used as a primer for appliances, such as refrigerators, stoves, washers, dryers and the like.

The graft copolymer utilized in the coating composition is prepared by first forming an epoxy ester prepolymer of an epoxy hydroxy polyether resin and a dimer dicarboxylic fatty acid in which one terminal epoxy group is reacted with a aliphatic, aromatic or cycloaliphatic monocarboxylic acid. The prepolymer is of epoxy resin/dimer fatty acid/epoxy resin/monocarboxylic acid. Then this prepolymer is reacted with an α,β-ethylenically unsaturated monocarboxylic acid. The α,β-ethylenically unsaturated monocarboxylic acid reacts with the epoxy group of the prepolymer and the resulting product polymerized with the ethylenically unsaturated backbone monomer units to form the graft copolymer. The α-β-ethylenically unsaturated monocarboxylic acid is the coupling unit which couples the epoxy ester prepolymers into the backbone of the polymer.

The resulting graft copolymer has a relative viscosity of about 1.040–1.100 measured at 0.5% polymer solids at 25° C. in dichloroethylene solvent. Preferably, the graft copolymer has a relative viscosity of about 1.060–1.070 and contains 30–50% by weight of backbone segment and 70–50% by weight of side chain segments. These preferred copolymers form high quality coating compositions.

The prepolymers are prepared by conventional polymerization techniques in which an epoxy hydroxy polyether resin, a dimer dicarboxylic fatty acid, and an aliphatic, aromatic or cycloaliphatic monocarboxylic acid, solvents and a polymerization catalyst are blended together and heated to about 120° to 200° C for about 1–3 hours to form epoxy ester prepolymers. Optionally, a bisphenol such as Bisphenol A can be utilized in the above polymerization to chain extend the epoxy resin. The resulting prepolymer is a epoxy resin/dimer dicarboxylic acid/epoxy resin that is terminated with a monocarboxylic acid.

Typical solvents and diluents which are used to prepare the epoxy ester prepolymer are, for example, toluene, xylene, butyl acetate, acetone, methylisobutyl ketone, methylethylketone, butyl alcohol, ethylene glycol monoethyl ether, ethylene glycol monoethyl ether acetate and other aromatic hydrocarbons, esters, ethers, ketones and alcohols.

About 0.1–4% by weight, based on the total weight of the constituents used to prepare the prepolymer, of a catalyst is used, such as sulfonic acid, organic tin compounds, such as butyl tin dilaurate, dibutyl tin oxide, litharge, titanium complexes, aromatic ammonium hydroxide compounds, for example, benzyltrimethylammonium hydroxide, tetramethylammonium chloride, tertiary amines such as triethylamine, benzyl dimethylamine, tributylamine and the like.

The epoxy hydroxy polyether resins utilized in preparing the epoxy ester prepolymers have the repeating structural formula

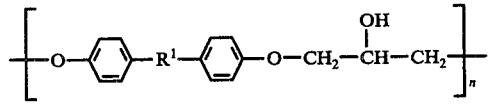

wherein $n$ is an integer sufficient to provide the epoxy resin with a weight average molecular weight of at least about 500 and up to about 4,000, and preferably, epoxy resins are used that have a weight average molecular weight of about 1500–3500.

One preferred epoxy resin is the reaction product of epichlorohydrin and Bisphenol A that ptovides a resin in which $R^1$ is

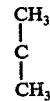

This epoxy resin readily forms coatings which have a balance of desired physical properties, such as high tensile strength, excellent solvent resistance and excellent adhesion to substrates and to acrylic lacquers or enamel topcoats. Another very useful epoxy resin is the reaction product of epichlorohydrin and Bisphenol F which provides a resin in which $R^1$ is $CH_2$.

The dimer dicarboxylic fatty acid used to prepare the epoxy ester prepolymer are the dimerization products of ethylenically unsaturated drying oil fatty acids. Typically useful dimer acids are "Empol" 1014, "EMpol" 1022, "Empol" 1024 and the like. One particularly useful dimer acid is the dimerization product of an 18 carbon atom drying oil fatty acid. The molar ratio of the epoxy resin to the dimer acid is maintained at about 2:1 to form an epoxy ester prepolymer with two reactive epoxy groups.

The aromatic, cycloaliphatic or aliphatic monocarboxylic acids that can be used to form the prepolymer are benzoic acid, phenylacetic acid, toluic acid, β-phenylpropionic acid, ethyl benzoic acid, trimethyl benzoic acid, acetic acid, propionic acid chloroacetic acid, hexahydorbenzoic acid, and the like. Benzoic acid is preferred since it forms a high quality composition.

The resulting epoxy ester prepolymer is reacted under the afore-mentioned reaction times and temperatures with an α,β-unsaturated carboxylic acid such as acrylic acid or methacrylic acid. The remaining epoxy group of the epoxy ester prepolymer reacts with the α,β-unsaturated carboxylic acid to provide a constituent that is polymerizable with the backbone constituents. The graft copolymer is then prepared by adding the backbone constituents. The constituents can be diluted with one of the aforementioned solvents and a polymerization catalyst is added and the constituents are heated to about 75°–150° C. for about 2–6 hours to form the graft copolymer.

About 0.1–4% by weight, based on the weight of the constituents used to prepare the graft copolymers, of a polymerization catalyst for the backbone monomers is used, such as ditertiary butyl peroxide, cumene hydroperoxide, azo-bis-isobutyronitrile.

Typical monomer units which are used to form the backbone of the graft copolymer are styrene, methyl methacrylate or mixtures thereof. About 0.5 to 5% by weight, based on the weight of the copolymer, of units of an α,β-unsaturated carboxylic acid are used.

About 0.5 to 10% by weight, based on the weight of the polymer, of acrylic adhesion promoting monomers which also aid in making the graft copolymer compatible with other polymers used in the coating composition are utilized. Typical monomers of this type are hydroxyaminopropyl methacrylate, diethylaminoethyl methacrylate, dimethylaminoethyl methacrylate, 2-aminoethyl methacrylate, t-butyl aminoethyl methacrylate, 2-(1-aziridinyl)-ethyl methacrylate, N-2-hydroxypropylmethacrylamide, N-2-hydroxyethyl methacrylamide and 3-(2-methacryloxyethyl)-2,2-spirocyclohexyloxazolidine.

The high molecular weight epoxy hydroxy polyether resin used in the coating compostion has the formula

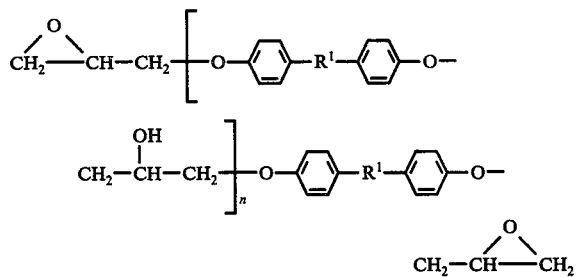

where $R^1$ is an alkylene group as described above and $n$ is an integer sufficiently large to provide a weight average molecular weight of about 30,000–200,000. In one particularly useful resin $R^1$ is

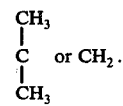

In one preferred resin that forms a good quality composition, $R^1$ is

and the resin has a weight average molecular weight of about 30,000–100,000.

The novel coating composition contains at least one heat reactive condensate. Typical heat reactive condensates that can be used are melamine formaldehyde which has at least been partially reacted with an aliphatic monohydric alcohol having 1–4 carbon atoms, alkylated urea formaldehyde having 1–4 carbon atoms in the alkyl group such as methylated urea formaldehyde, alkylated benzoguanamine formaldehyde having 1–4 carbon atoms in the alkyl group such as butylated benzoguanamine formaldehyde or mixtures of these heat reactive condensates.

Butylated benzoguanamine formaldehyde and methylated urea formaldehyde are particularly useful heat reactive condensates. In particular, mixtures of butylated benzoguanamine formaldehyde and methylated urea formaldehyde are preferred and form excellent primers with good adhesion and corrosion resistance.

About 0.5–3.0% by weight, based on the weight of the film forming constituents, of cellulose acetate butyrate can be added to the composition. A typical useful cellulose acetate butyrate that can be used has a viscosity of 1–6 seconds measured according to ASTMD 1343-56 and a butyryl content of about 17–55%. One particularly useful cellulose acetate butyrate has a viscosity of 2 seconds measured as above and a 38% butyryl content.

Small amount of a plasticizer, for example, 0.1–5% by weight, based on the weight of film-forming constituents, can also be used in the composition. Typically useful plasticizers are butyl benzyl phthalate, dibutyl phthalate, triphenyl phosphate, 2-ethylhexylbenzyl phthalate, dicyclohexyl phosphate, 2-ethylhexylbenzyl phthalate, dicyclohexyl phthalate, dibenzyl phthalate, butylcyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethylhexylester of hexamethylene diphthalate, di(methylcyclohexyl) phthalate and the like.

Other plasticizers can be used and are epoxidized soya bean oil, oil-free and oil-modified alkyd resins, and polyesters, such as polyethylene terephthalate esters, polyalkylene adipate esters, polyarylene adipate esters, polyesters of adipic acid/neopentyl glycol/benzoic acid, polyesters of coconut oil/phthalic anhydride/ethylene glycol and the like.

Pigments can be used in the novel coating composition of this invention in a pigment volume concentration of about 0.1–60.0%. Preferably, the pigment is formed into a mill base using conventional techniques and then blended with the composition. Examples of the great variety of pigments which are used in the coating composition of this invention are metallic oxides, preferably titanium dioxide, zinc oxide, iron oxide and the like, aluminum silicate, barytes, metal flakes, metal powders, sulfides, sulfates, carbonates, carbon black, silica, silicates, talc, china clay, lead and iron blues, organic reds, maroons, organic dyes, lakes, etc. One preferred pigment blend for a primer composition is as follows: carbon black, titanium dioxide and aluminum silicate.

The coating compositions can be applied to a variety of substrates, for example, unprimed or primed metal substrates, wood, glass, plastics, such as polypropylene, styrene, copolymers of styrene and the like, by any of the usual application methods, such as spraying, electrostatic spraying, dipping, brushing, flow-coating and the like. These coatings are baked at about 110°–200° C. for about 10–60 minutes. The resulting coating is about 0.5–5 mils thick, preferably 1–3 mils thick and can be buffed or sanded by conventional techniques, if desired, to improve smoothness. A topcoating for example of an acrylic composition about 1–5 mils thick can be applied over the coating.

The coating composition has excellent adhesion to bare or treated metals or to metals which have been previously coated with epoxy, alkyd or acrylic primers or enamels. Also, in addition to its use as a primer, the composition can be a highly pigmented coating or can be used as an unpigmented sealer coating. When used as a primer or a sealer composition, topcoats of lacquers or enamels have excellent adherence and also have excellent mar and chip and scratch resistance.

The following Examples illustrate this invention. The parts and precentages are by weight unless otherwise specified.

EXAMPLE 1

An epoxy ester acrylic graft copolymer is prepared as follows:

|  | Parts By Weight |
|---|---|
| Portion 1 | |
| Epoxy resin[1] solution (96.5% solids in a solvent mixture of 89% xylene and 11% ethylene glycol monoethylether) | 1512 |
| Bisphenol A | 610 |
| "Empol" 1014 Dimer fatty acids (dimerization product of 18 carbon atom drying oil fatty acids | 316 |
| Benzoic acid | 65 |
| Dimethyl benzyl amine | 3 |
| Ethylene glycol monobutyl ether | 670 |
| Methylethyl ketone | 31 |

(1) The epoxy resin has the following structural formula:

$$CH_2 \underset{O}{-}CH-CH_2-\left[O-\underset{}{\phenyl}-\underset{CH_3}{\overset{CH_3}{C}}-\phenyl-O-CH_2-\underset{OH}{CH}-CH_3\right]_n$$

$$O-\phenyl-\underset{CH_3}{\overset{CH_3}{C}}-\phenyl-O-CH_2-CH\underset{O}{-}CH_2$$

n is a positive integer sufficiently large to provide a Gardner-Holdt viscosity measured on undiluted resin at 25° C. of 100–160 poises and has an epoxy equivalent of 180–195. The epoxy equivalent is the grams of resin containing 1 gram equivalent of epoxide.

| Portion 2 | |
|---|---|
| Methyl ethyl ketone | 71 |
| Portion 3 | |
| Acrylic Acid | 102 |
| Portion 4 | |
| Methylethyl ketone | 2961 |
| Portion 5 | |
| Dodecyl mercaptan | 19 |
| Portion 6 | |
| Methyl methacrylate monomer | 1450 |
| Diethylamino ethyl methacrylate monomer | 82 |
| Azo-bis-isobutyronitrile | 7 |
| Portion 7 | |
| Azo-bis-isobutyronitrile | 21 |
| Methyl ethyl ketone | 280 |
| Total | 8200 |

Portion 1 is charged into a reaction vessel equipped with a stirrer, a reflux condenser and a heating mantle and the resulting mixture is heated to 132° C. The heating mantle is turned off and the temperature of the mixture increases to 175°–185° C. because of an exothermic reaction. The heating mantle is turned on and the mixture is held at its reflux temperature for about 1 hour. Portion 2 is added and the mixture cools to about 145° C. Portion 3 is then added and the mixture is heated to its reflux temperature and maintained at this temperature for about an hour and the acid number of the mixture is measured and is about 19–21. The heating mantle is turned off and Portion 4 is added and then Portion 5 is added. Portion 6 is premixed and then added. An exothermic reaction occurs and the mixture is maintained at a temperature of about 90° C. for about 45 minutes.

Portion 7 is premixed and added to the mixture as follows while the mixture is held at 90° C: 35% of Portion 7 is added and the mixture is held at the above temperature for about 30 minutes; 25% of Portion 7 is added and the mixture is held at the above temperature for about 30 minutes; 20% of Portion 7 is added and the mixture is held at the above temperature for 30 minutes; and 20% of Portion 7 is added and the mixture is held at the above temperature for 45 minutes.

The resulting polymer solution has a polymer solids content of about 49% and the solution has a Gardner-Holdt viscosity measured at 25° C. of N. The polymer has an acid number of 10.3 and a relative viscosity of 1.067 measured at 0.5% polymer solids in dichloroethylene at 25° C. About 40% of the resulting graft copolymer is acrylic backbone and about 60% of the polymer is epoxy ester side chains. The backbone is of about 2.5% by weight, based on the weight of the graft copolymer, of acrylic acid, 35.5% by weight of methyl methacrylate, 2.0% by weight of diethyl aminoethyl methacrylate and the side chains are 50.7% by weight of epoxy resin, 7.7% by weight of dimer fatty acids and 1.6% by weight of benzoic acid.

A mill base is prepared as follows:

|  | Parts By Weight |
|---|---|
| Portion 1 | |
| Polymer solution (prepared above) | 740 |
| Butanol | 268 |
| Ethylene glycol monobutyl ether | 268 |
| Hydrocarbon solvent (having a boiling point of 150 – 190 ° C. and an aniline point of −28 ° C.) | 537 |
| Carbon Black Pigment | 13 |
| Titanium dioxide pigment | 295 |
| Aluminum silicate pigment | 1770 |
| Portion 2 | |
| Copolymer solution (prepared above) | 109 |
| Total | 4000 |

Portion 1 is charged into a ball mill and ground to a fineness of less than 0.5 mil. Portion 2 is added and ground in the ball mill for an additional hour.

A primer is prepared as follows:

|  | Parts By Weight |
|---|---|
| Mill base (prepared above) | 522 |
| Polymer solution (prepared above) | 240 |
| Butylated Benzoguanamine formaldehyde solution (66% solids in butanol) | 44 |
| Methylated urea formaldehyde | 28 |
| "Eponol" resin solution (40% solids epoxy resin having the aforementioned formula and a weight average molecular weight of about 80,000 determined by gel permeation chromatography and having a Gardner Holdt viscosity measured at 25° C. of X-Z₃) | 143 |
| Ethylene glycol monobutyl ether | 75 |
| Butanol | 75 |
| Xylene | 100 |
| Total | 1227 |

The above ingredients are charged into a mixer and thoroughly blended together. A portion of the primer is tested for shelf stability. The primer is placed in cans and sealed and exposed to 44° and 65° C. The primer has a satisfactory shelf stability.

The remainder of the primer is reduced to a spray viscosity using the following solvent blend: ethylene glycol monobutyl ether/ethylene glycol monoethyl ether/butanol/xylene/methylethyl ketone in a weight ratio of 10/20/20/30/20. The primer is sprayed onto a phosphatized steel panel and baked at 163° C. for 45 minutes. The primer has excellent adhesion to the steel substrate and has excellent resistance to salt spray.

A set of phosphatized steel panels is sprayed with the primer and baked as above. These panels are then topcoated with a conventional acrylic lacquer which is baked for about 30 minutes at 156° C. The resulting finish has a good appearance, good gloss, good chip resistance, excellent resistance to weathering, excellent adhesion and excellent corrosion resistance.

EXAMPLE 2

A primer is prepared as follows:

|  | Parts By Weight |
|---|---|
| Mill base (prepared in Example 1) | 391 |
| Polymer solution (prepared in Example 1) | 180 |
| "Eponol" resin solution (described in Example 1) | 108 |
| Methylated urea formaldehyde | 43 |
| Ethylene glycol monobutyl ether | 35 |
| Butanol | 68 |
| Xylene | 52 |
| Methanol | 23 |
| Total | 900 |

The above ingredients are charged into a mixer and thoroughly blended together to form a primer. The primr has a satisfactory shelf stability as shown by the test of Example 1. The primer is reduced to a spray viscosity using the solvent blended described in Example 1 and sprayed onto phosphatized steel panels and baked for about 35 minutes at about 150° C. The primer has excellent adhesion to the substrate and has excellent corrosion resistance.

A separate set of phosphatized steel panels is sprayed with the primer and baked as above and topcoated with a conventional acrylic lacquer and baked for 30 minutes at about 160° C. The resulting finish has a good appearance, good gloss, good chip resistance, good resistance to weathering, excellent adhesion to the steel substrate and excellent corrosion resistance.

EXAMPLE 3

A primer is prepared as follows:

|  | Parts By Weight |
|---|---|
| Mill Base (prepared in Example 1) | 381 |
| Polymer solution (prepared in Example 1) | 163 |
| Butylated benzoguanamine formaldehyde solution (66% solids in butanol) | 32 |
| "Eponol" resin solution (described in Example 1) | 105 |
| Methylated urea formaldehyde | 21 |
| Ethylene glycol monobutyl ether | 55 |
| Butanol | 55 |
| Xylene | 38 |
| Methanol | 22 |
| Cellulose Acetate butyrate solution (25% solids in 70/30 toluene/acetone solvent of cellulose acetate butyrate having a 2 second viscosity measured according to ASTMD 1343-56 and a butyryl content of 38%) | 25 |
| Total | 897 |

The above ingredients are charged into a mixer and thoroughly blended together to form a primer. The primer has a satisfactory shelf stability as shown by the test of Example 1. The primer is reduced to a spray viscosity using the solvent blended described in Example 1 and sprayed onto phosphatized steel panels and baked for about 35 minutes at about 150° C. The primer has excellent adhesion to the substrate and has excellent corrosion resistance.

A separate set of phosphatized steel panels is sprayed with the primer and baked as above and topcoated with a conventional acrylic lacquer and baked for 30 minutes at about 160° C. The resulting finish has a good appearance, good gloss, good chip resistance, good resistance to weathering, excellent adhesion to the steel substrate and excellent corrosion resistance.

The invention claimed is:

1. A coating composition comprising a solution of 5-60% by weight of film-forming constituents in an organic solvent; wherein the film-forming constituents consist essentially of (1) 20-85% by weight of an acrylic epoxy ester graft copolymer having a relative viscosity of about 1.040-1.100 measured at 0.5% polymer solids in dichloroethylene solvent at 25° C. and consisting essentially of 10-75% by weight of a polymeric backbone segment and 90-25% by weight of polymer side chain segments; wherein (a) the polymeric backbone segment of the graft copolymer consists essentially of polymerized monomers selected from the group consisting of methyl methacrylate, styrene and mixtures thereof; and about 0.5-5% by weight, based on the weight of the copolymer, of polymerized methacrylic acid or acrylic acid monomers; and about 0.5-10% by weight, based on the weight of the copolymer, of polymerized adhesion promoting acrylic monomers selected from the group consisting of hydroxyaminopropyl methacrylate, diethylaminoethyl methacrylate, dimethylaminoethyl methacrylate, 2-aminopropyl methacrylate, 2-aminoethyl methacrylate, t-butyl aminoethyl methacrylate, 2-(1-aziridinyl)-ethyl methacrylate, N-2-hydroxypropyl methacrylamide, N-2-hydroxyethyl methacrylamide and 3-(2-methacryloxyethyl)-2,2-spirocyclohexyloxazolidine;

(b) the polymeric side chain segments are grafted into the backbone segment and consist essentially of the following formula which is shown as being grafted into the backbone segment

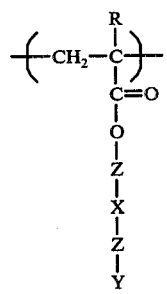

wherein
R is H or CH$_3$;
Z is the residual of an epoxy hydroxy polyether resin that has the following recurring structural unit

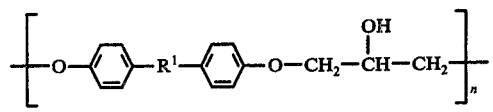

where $n$ is a positive integer sufficiently large to provide a weight average molecular weight of 500-4,000 and R$^1$ is an alkylene group;

X is the residual of a dimer dicarboxylic fatty acid in which the carboxyl groups of the fatty acid are reacted with terminal epoxy groups of th expoxy hydroxy polyether resin; and Y is the residual of an aromatic, cycloaliphatic or aliphatic monocarboxylic acid in which the carboxyl group is reacted with a terminal epoxy group of the epoxy hydroxy polyether resin;

(2) 5-70% by weight of an epoxy hydroxy polyether resin of the formula

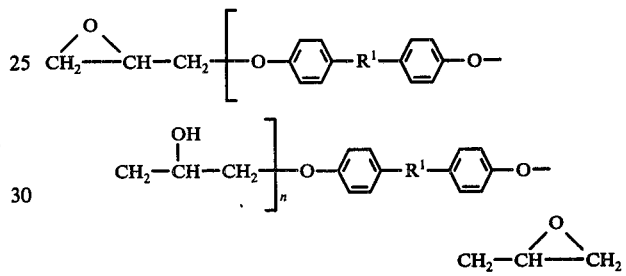

where R$^1$ is an alkylene group and $n$ is an integer sufficiently large to provide a weight average molecular weight of about 30,000-200,000; and (3) 10-35% by weight of a heat reactive condensate selected from the group consisting of an alkylated melamine formaldehyde, an alkylated urea formaldehyde, an alkylated benzoguanamine formaldehyde or mixtures thereof wherein the alkyl groups have 1-4 carbon atoms.

2. The coating composition of claim 1 containing pigment in a pigment volume concentration of about 0.1-60%.

3. The coating composition of claim 2 in which the pigment consists essentially of titanium dioxide, carbon black and aluminum silicate.

4. The coating composition of claim 3 in which R$^1$ is either CH$_2$ or

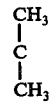

5. The coating composition of claim 4 in which the heat reactive condensate is a mixture of methylated urea formaldehyde and butylated benzoguanamine formaldehyde.

6. The coating composition of claim 4 in which the heat reactive condensate is methylated urea formaldehyde.

7. The coating composition of claim 4 in which the adhesion promoting acrylic monomers are selected from the group consisting of tertiary butylamino ethyl methacrylate and diethylaminoethyl methacrylate.

8. The coating composition of claim 4 containing about 0.5–3.0% by weight, based on the weight of the film forming constituents, of cellulose acetate butyrate having a butyryl content of 17–55% by weight and a viscosity of 1–6 seconds.

9. The coating composition of claim 4 in which the monocarboxylic acid is benzoic acid.

10. The coating composition of claim 3 in which the film-forming constituents consist essentially of
(1) 55–65% by weight of the acrylic epoxy ester graft copolymer comprises 30–50% by weight of backbone segment and 70–50% by weight of side chain segment,
  (a) the polymeric backbone segment consist essentially of methyl methacrylate acrylic acid and diethylaminoethyl methacrylate; and
  (b) the polymeric side chains consist essentially of residual of an epoxy hydroxy polyether resin in which R¹ is

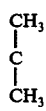

and where
n is sufficiently large to provide a weight average molecular weight of about 1500 to 3500; and
X is the residual of a dimer dicarboxylic fatty acid in which the dimerization product is of 18 carbon atom fatty acids; and
Y is the residual of benzoic acid
(2) 15–25% by weight of an epoxy hydroxy polyether resin in which R¹ is

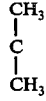

and having a weight average molecular weight of about 30,000–100,000;
(3) 5–15% by weight of butylated benzoguanamine formaldehyde; and
(4) 5–15% by weight of methylated urea formaldehyde.

11. The coating composition of claim 3 in which the film-forming constituents consist essentially of
(1) 35–45% by weight of the acrylic epoxy ester graft copolymer wherein
  (a) the polymeric backbone segment consist essentially of methyl methacrylate, acrylic acid and diethylaminoethyl methacrylate; and
  (b) the polymeric side chains consist essentially of the residual of an epoxy hydroxy polyether resin in which R¹ is

and where
n is sufficiently large to provide a weight average molecular weight of about 1500 to 3500; and
X the residual of a dimer dicarboxylic fatty acid in which the dimerization product is of 18 carbon fatty acids; and
Y is the residual of benzoic acid
(2) 35–45% by weight of an epoxy hydroxy polyether resin in which R¹ is

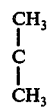

and having a weight average molecular weight of about 30,000–100,000;
(3) 5–15% by weight of methylated urea formaldehyde;
(4) 5–15% by weight of butylated benzoguanamine formaldehyde.

12. The coating composition of claim 3 in which the film-forming constituents consist essentially of
(1) 55–65% by weight of the acrylic epoxy ester graft copolymer wherein
  (a) the polymeric backbone segment consist essentially of methyl methacrylate, acrylic acid and diethylaminoethyl methacrylate; and
  (b) the polymeric side chains consist essentially of the residual of an epoxy hydroxy polyether resin in which R¹ is

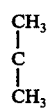

and where
n is sufficiently large to provide a weight average molecular weight of about 1500 to 3500; and
X the residual of a dimer dicarboxylic fatty acid in which the dimerization product is of 18 carbon fatty acids; and
Y is the residual of benzoic acid
(2) 10–35% by weight of an epoxy hydroxy polyether resin in which R¹ is

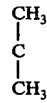

and having a weight average molecular weight of about 30,000–100,000; P1 (3) 15–25% by weight of methylated urea formaldehyde.

13. The coating composition of claim 12 containing 0.5–3% by weight, based on the weight of the film-forming constituents, of cellulose acetate butyrate having a butyryl content of 17–55% by weight and a viscosity of 1–6 seconds.

14. A metal substrate coated with a 0.5–5.0 mil thick layer of a dried cured composition of claim 1.

15. A phosphatized steel sheet coated with a 1.0–3.0 mil thick layer of a dried cured composition of claim 3 and having superimposed thereon a 1–5 mil thick layer of a dried coalesced or cured acrylic coating composition.

* * * * *